United States Patent
Ramaswamy et al.

(10) Patent No.: US 10,110,437 B2
(45) Date of Patent: Oct. 23, 2018

(54) METHOD AND APPARATUS TO DETECT UNIDENTIFIED INVENTORY

(71) Applicant: Cisco Technology, Inc., San Jose, CA (US)

(72) Inventors: Krishnan Ramaswamy, San Jose, CA (US); Suresh Thirukazhukundram, Sunnyvale, CA (US); Christopher Camplejohn, Raleigh, NC (US); Keith Sinclair, San Jose, CA (US); Edward Rosen, Tampa, FL (US); Sunil John, San Jose, CA (US); Gaurav Garg, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 14/532,863

(22) Filed: Nov. 4, 2014

(65) Prior Publication Data
US 2015/0058468 A1   Feb. 26, 2015

Related U.S. Application Data

(63) Continuation of application No. 13/040,097, filed on Mar. 3, 2011, now Pat. No. 8,880,669.

(51) Int. Cl.
*G06F 15/173* (2006.01)
*H04L 12/24* (2006.01)

(52) U.S. Cl.
CPC .......... *H04L 41/12* (2013.01); *H04L 41/0853* (2013.01); *Y02D 30/30* (2018.01)

(58) Field of Classification Search
CPC .... G06F 15/173; H04L 41/0123; H04L 41/12
USPC .................................. 709/223–226
See application file for complete search history.

(56) References Cited

U.S. PATENT DOCUMENTS

| | | | |
|---|---|---|---|
| 2006/0161816 A1 | 7/2006 | Gula et al. | |
| 2006/0203819 A1* | 9/2006 | Farinacci | H04L 45/00 370/390 |
| 2010/0278076 A1* | 11/2010 | Reddy | H04L 41/0806 370/254 |
| 2011/0167145 A1* | 7/2011 | Bush | H04L 12/2807 709/223 |

* cited by examiner

*Primary Examiner* — Sibte Bukhari
(74) *Attorney, Agent, or Firm* — Hickman Palermo Becker Bingham LLP (57) ABSTRACT

Techniques are disclosed for detecting unidentified inventory in a network. In one embodiment, data that was collected from a plurality of network devices is received. The data includes at least one device identifier for a neighboring network device of at least one network device of the plurality of network devices. The at least one device identifier for the neighboring network device is compared to one or more device identifiers of known network devices. In response to determining that the at least one device identifier for the neighboring network device does not match a device identifier for the known network devices, the at least one device identifier is added to a list of unidentified inventory.

8 Claims, 6 Drawing Sheets

METHOD AND APPARATUS TO DETECT UNIDENTIFIED INVENTORY

CROSS-REFERENCE TO RELATED APPLICATIONS; PRIORITY CLAIM

This application claims benefit as a Continuation of application Ser. No. 13/040,097, filed Mar. 3, 2011 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to data communications networks and, more specifically, to detecting unidentified inventory on a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer network generally includes a number of different network devices. For example, the network may include network element devices, such as switches and routers, as well as end station devices, such as desktop machines, servers, hosts, printers, fax machines, and others network resources. In order for the computer network to function properly, network administrators monitor the various devices, deploying new devices or upgrading existing ones in the network. In addition, the network administrator is responsible for configuration management of the network and manages distribution of software on the network. Typically, a network administrator employs a network management system to accomplish such tasks.

The network management system (NMS) is a software program, or a combination of hardware and software, that perform tasks related to assisting the network administrator manage the network. The NMS sometimes includes network inventory and analysis tools, such as a network collector, in order to gather information about managed devices on the network. In a typical configuration, a seed file is programmed into the network collector. The seed file identifies network devices for the network collector to track. In order to track the network devices, the network collector routinely logs into devices identified by the seed file to collect hardware inventory and software configuration data. The network collector may store the collected data locally on a device executing the network collector or transmit the collected data to a remote location for further analysis. The collected data may then be used to inventory, analyze, and configure network devices. Thus, the network collector helps the network administrator efficiently manage a large number of network devices. An example of a network collector is Cisco Network Collector, commercially available from Cisco Systems, Inc., San Jose, Calif.

Syslog messages are also commonly used to help network administrators identify problems in a network. Many network devices are configured to send syslog messages to an event collector, such as a syslog server, in response to specific events. The syslog protocol separates the content of a message from the transport of the message. In other words, the device sending the syslog message does not require any communication from the devices transporting or logging the message. This enables devices, which would otherwise be unable to communicate, to notify network administrators of problems. The syslog standard is documented in RFC 3164 and RFC 5424 of the Internet Engineering Task Force.

In some instances, organizations struggle to manage large, complex networks. For example, large scale migrations of hardware or software may result in devices that are accidently forgotten, thereby leaving them operating with previous network management standards. As standards for passwords or other management capabilities, such as Simple Network Management Protocol (SNMP) strings, change over time, the devices fall further from manageability and visibility. In other cases, devices that are newly deployed as a replacement, upgrade, or new addition sometimes lack network management standards from the outset, even if the newly deployed devices have other configuration elements that enable them to function in the network. Therefore, these devices may be erroneously omitted from the network inventory identified by the network collector.

One approach for locating and identifying missing network devices involves performing ping sweeps or other wide-scale invasive search. A ping sweep, for example, typically involves transmitting Internet Control Message Protocol (ICMP) ECHO messages to a range of IP addresses to determine if any devices respond. Network administrators generally disfavor such invasive searches because they often trigger security alarms and are commonly used by intruders in an attempt to gain unauthorized access to the network. Furthermore, ping sweeps may not detect devices that have become inoperative or otherwise unable to respond.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Gathering Device Information to Detect Unidentified Inventory
   3.1 Profiling Neighbor Relationship and Topology Data
   3.2 Profiling Topology Data
   3.3 Profiling Syslog Messages
   3.4 Determining Device Status
4.0 Consolidating Gathered Device Information
   4.1 Processing the Missing Device
   4.2 Generating and Consolidating Scores
   4.3 Deriving a Final Report of Unidentified Inventory
5.0 Implementation Mechanisms—Hardware Overview
6.0 Extensions and Alternatives

1.0 GENERAL OVERVIEW

Techniques for detecting unidentified inventory in a network are described. In an embodiment, data that was collected from a plurality of network devices is received. The data includes at least one device identifier for a neighboring network device of at least one network device of the plurality of network devices. The at least one device identifier for the neighboring network device is compared to one or more device identifiers of known network devices. In response to determining that the at least one device identifier for the neighboring network device does not match a device identifier for the known network devices, the at least one device identifier is added to a list of unidentified inventory.

In one embodiment, for each selected network device of the plurality of network devices, it is determined whether data collected from the selected network device includes a set of device identifiers for a set of neighboring network devices. Each device identifier of the set of device identifiers is compared to the one or more device identifiers of the known network devices to determine which neighboring devices of the set are unidentified.

In one embodiment, for each unidentified network device, it is determined whether a corresponding device identifier for the unidentified network device has been added to the list of unidentified inventory. If the corresponding device identifier has not been added to the list of unidentified inventory, then the corresponding device identifier is added to the list of unidentified inventory.

In one embodiment, the device identifier for the selected network device that detected the unidentified network device is added to a list of devices that have detected the unidentified network device.

In one embodiment, a score for each unidentified network device is generated. The score is based, at least in part, on how many selected network devices of the plurality of network devices detected the unidentified network device.

In one embodiment, if the corresponding device identifier has already been added to the list of unidentified inventory, the score for the unidentified network device is incremented.

In one embodiment, the list of unidentified inventory is sorted based on the score for each unidentified network device on the list of unidentified inventory.

In one embodiment, it is determined whether the unidentified network device sent a syslog message. In response to determining that the unidentified network device sent a syslog message, the score for the unidentified network device is incremented.

In one embodiment, the data collected from the selected network device includes Cisco Discovery Protocol (CDP) or Link Layer Discovery Protocol (LLDP) data.

In one embodiment, the data collected from the selected network device includes topology data from a topology table of the selected network device.

In one embodiment, a topology exception for a network device on a managed network is determined. In response to determining that there is a topology exception, one or more network identifiers for unidentified network devices are identified based on topology data from the network device. The one or more network identifiers are added to a list of unidentified inventory.

In one embodiment, the topology exception is a subnet topology exception and the unidentified network device is a partner node of the network device.

In one embodiment, the topology exception is a topology protocol exception and the unidentified network device is an unidentified Border Gateway Protocol (BGP) neighbor of the network device.

In one embodiment, the topology exception is a topology protocol exception and the unidentified network device is an unidentified Data-Link Switching (DLSw) neighbor of the network device.

In one embodiment, the steps of determining that there is a topology exception and in response, identifying one or more network identifiers for unidentified network devices are performed for plurality of network devices. A score is generated for each unidentified network device based on how many network devices detect the unidentified network device.

In one embodiment, a device identifier for a network device that sent a syslog message is determined from the syslog message. The device identifier is compared to device identifiers for known network devices. In response to determining that the device identifier does not match a device identifier for the known network devices, the device identifier is added to a list of unidentified inventory.

In one embodiment, the syslog message is one of a plurality of syslog messages that are logged by a syslog server.

In one embodiment, the steps of determining, comparing, and adding are performed for each syslog message that is logged by the syslog server.

In one embodiment, the plurality of syslog messages are collected from a syslog server using a network collector.

In one embodiment, the device identifier is at least one of an Internet Protocol (IP) address or a hostname.

In other embodiments, the invention encompasses a computer apparatus and a computer-readable medium configured to carry out the foregoing steps.

The terms "missing devices", "unknown devices", and "unidentified inventory" are used interchangeably herein and refer to the same concept.

2.0 STRUCTURAL AND FUNCTIONAL OVERVIEW

Figure 1:
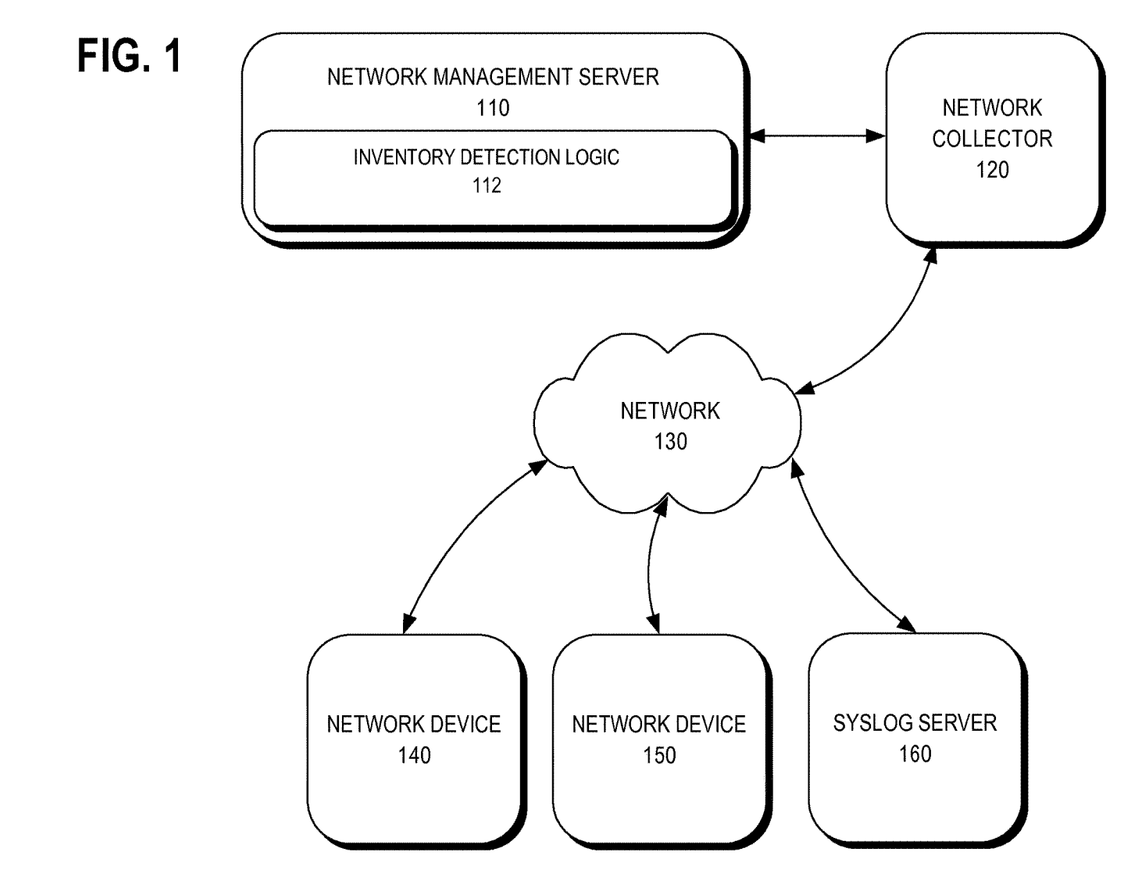
FIG. 1 illustrates a system that detects unidentified inventory in a network based on data collected by a network collector in accordance with an embodiment.

FIG. 1 illustrates a system that detects unidentified inventory in a managed network based on data collected by a network collector in accordance with an embodiment. Network arrangements vary from implementation to implementation and the exact network arrangement illustrated in FIG. 1 is not required.

Network collector 120 is communicatively coupled to a plurality of network devices, including network devices 140 and 150 through network 130. Network devices 140 and 150 may be network element devices, such as a switch or a router, or network endpoint stations, such as a workstation, server, host, printer, fax machines, mobile phone, or other endpoint device. Network 130 may comprise one or more public networks, such as the Internet, the public switched telephone network (PSTN), one or more private networks, such as a Local Area Network (LAN) or an enterprise network, or any other type of data communication channel through which network collector 120 may communicate with and collect data from network device 140, network device 150, and syslog server 160. Network 130 may also be divided into one or more subnetworks, which may partition the network address space of an organization. In one embodiment, network 130 is a private or virtual private enterprise network.

Network collector 120 is a software program, or a combination of hardware and software, that routinely logs into managed network devices to collect hardware inventory and software configurations for the respective devices. In one embodiment, network collector 120 is programmed with a seed file. The initial seed file may be provided by a network administrator, a customer, or any other entity with knowledge of managed devices that are connected to network 130. The seed file includes data that network collector 120 uses to identify and collect data from managed network devices. For example, the seed file may include an Internet Protocol (IP) address or a resolvable hostname for each managed device on network 130. In addition, the seed file may include a Simple Network Management Protocol (SNMP) Read-Write (RW) or Read-Only (RO) string, a telnet or Secure Shell (SSH) login password, and an enable password for one or more of the managed devices.

In one embodiment, network collector 120 is configured to collect data using Simple Network Manage Protocol (SNMP). Network collector 120 issues SNMP requests to managed devices on network 130 to collect network information, such as inventory, performance, neighbor relationship, topology, configuration, and/or other data stored on the managed device. For example, network collector 120 may issue a request to a device, such as network device 140, using an SNMP RW or RO string with instructions for the device to send the configuration file. In response, the device sends the requested information, if available.

In one embodiment, network collector 120 is configured to collect data using the Secure Shell (SSH) Protocol. Network collector 120 includes an SSH client program to establish a secure channel between network collector 120 and one or more network devices on network 130 that support SSH login. Network collector 120 uses SSH login passwords, which may be provided by the seed file, in order to establish the secure channel and login to the network devices. Once the secure channel is established, all traffic between network collector 120 and the one or more network devices is encrypted, and network collector 120 may securely access and collect network information from the network devices.

In one embodiment, network collector 120 is configured to collect data using the Telnet protocol. Network collector 120 includes a Telnet client program which establishes a Telnet connection, such as described in Internet Standard STD 8 of the Internet Engineering Task Force, with network devices on network 130. Once the Telnet connection is established, network collector 120 gathers network data from the one or more network devices.

Syslog server 160 is communicatively coupled to a plurality of network devices, including network devices 140 and 150, and is configured to receive syslog messages from the plurality of network devices. For example, network device 140 may be configured to send a syslog message, as described in RFC 3164 and RFC 5424, in response to a particular event. Syslog server 160 receives the message from network device and logs the message in a database.

Network collector 120 is communicatively coupled to syslog server 160 and may access and collect syslog messages logged by syslog server 160. Syslog server 160 is software, or a combination or hardware and software. In one embodiment, network management server 110 is configured to act as syslog server 160. Thus, network devices may be configured to send syslog messages directly to network management server 110. Alternatively, syslog server 160 may be remotely located from network management server 110. In such as case, network collector 120 routinely logs into Syslog server 160 to collect logged syslog messages.

Network management server 110 stores data gathered by network collector 120. In one embodiment, network management server 110 stores neighbor relationship data, such as layer two or layer three neighbor relationships, for managed devices on network 130. In addition, network management server 110 may store network configurations, topology table data for the managed devices, inventory data, and syslog messages generated by managed or non-managed devices. Network management server 110 may execute on a same or different computing device as network collector 120. In one embodiment, network management server 110 and network collector 120 are communicatively coupled by the Internet. Collected and/or inventoried data from network 130 is securely transported back to network management server 110 by Hypertext Transfer Protocol Secure (HTTPS) using the Advanced Encryption Standard (AES).

Network management server 110 includes inventory detection logic 112, which uses the data collected by network collector 120 and stored on network management server 110 to detect the devices missing from a database of network inventory. Inventory detection logic 112 examines multiple sources of evidence of a missing device's presence to calculate a score indicating the likelihood that it should be included in network inventory. Inventory detection logic 112 generates a report of missing inventory based on the calculated score. The generated report may be accessed and viewed by a network administrator to determine whether the missing devices should be added to managed inventory.

Figure 2:
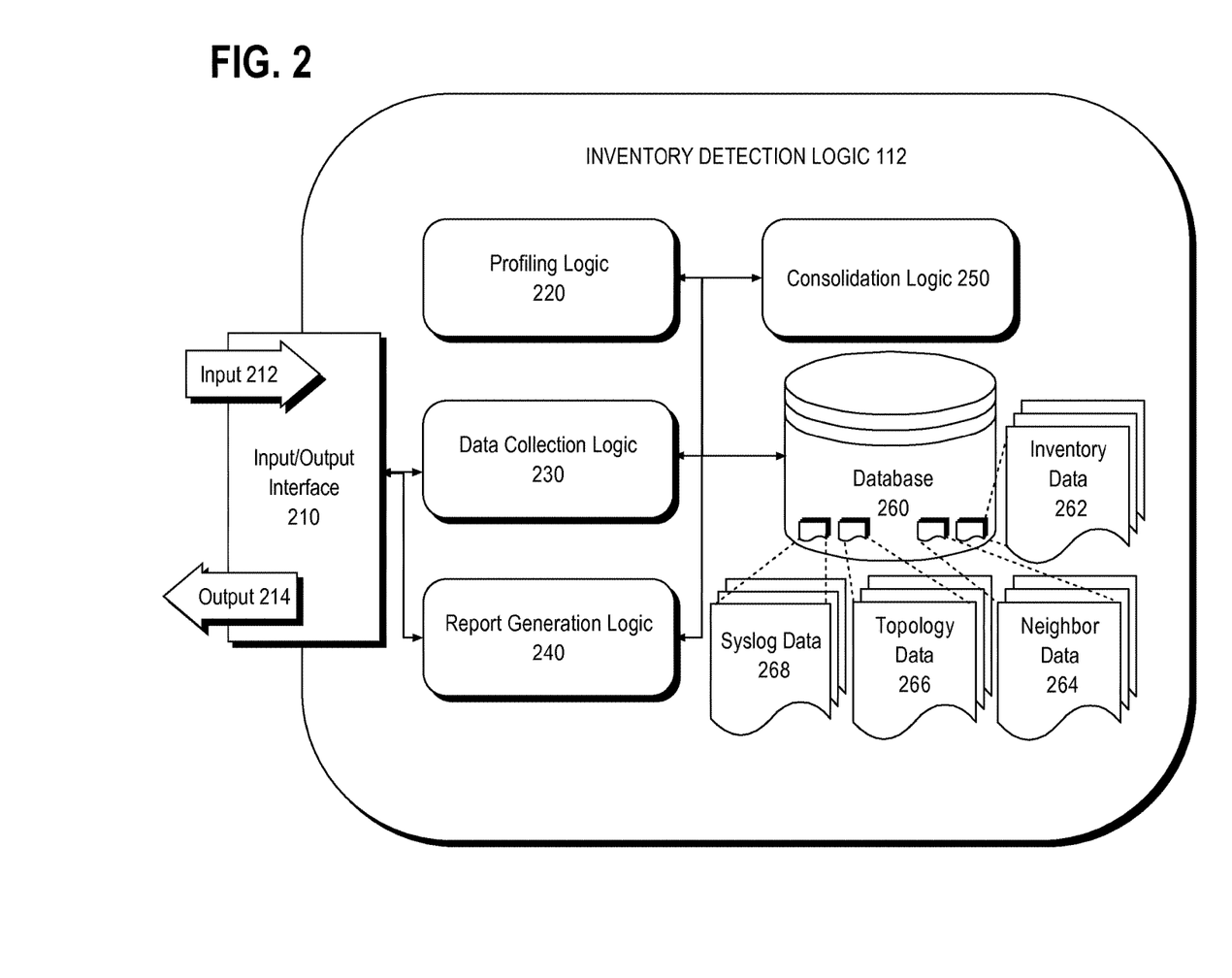
FIG. 2 illustrates inventory detection logic to detect unidentified inventory in accordance with an embodiment.

FIG. 2 is a block diagram that illustrates inventory detection logic 112 of FIG. 1. Inventory detection logic 112 detects missing devices based on the data collected for each managed device and the syslog data received by network management server 110.

Referring to FIG. 2, input 212 is received by inventory detection logic 112 at input/output (IO) interface 210. IO interface 210 may be a network interface such as a wireless or Ethernet-based interface. IO interface 210 includes one or more communication protocols for communicating with network collector 120 and logic configured to parse and distribute incoming data and to prepare output 214 for transmission via IO interface 210. Input 212 includes data gathered by network collector 120 from managed network devices on network 130. IO interface 210 is coupled to data collection logic 230 and inventory report generation logic 240, according to an embodiment.

Data collection logic 230 receives data from IO interface 210 that was gathered by network collector 120. Data collection logic 230 is coupled to database 260 and parses the collected data to determine how it should be stored in database 260. For example, data collection logic 230 determines whether the data is inventory data, neighbor data, topology data, or syslog data. In response to determining the type of data, data collection logic 230 causes the data to be stored in the appropriate location in database 260. Data collection logic 230 may also format the data before it is stored.

Database 260 stores data that were gathered by network collector 120. In one embodiment, database 260 stores inventory data 262, neighbor data 264, topology data 266, and syslog data 268. Inventory data 262 may include a list of known, managed devices that are deployed on network 130. This information is determined based on the seed file and/or device discovery performed by network collector 120. Inventory data 262 may also include a database of unknown inventory, as described further below. Neighbor data 264 includes information about neighboring devices that was collected by network collector 120 from the managed devices. For example, neighbor data 264 may comprise Cisco Discovery Protocol (CDP) or Link Layer Discovery Protocol (LLDP) data identifying a managed device's neighbors. This information is typically available as Management Information Base (MIB) and/or Command Line Interface (CLI) data stored in the managed device. Topology data 266 includes information regarding topology exceptions. This information is gathered by network collector 120 from the topology table of managed network element devices, such as routers, that are deployed on network 130. Syslog data includes syslog messages sent directly from a network device to network management server 110, or collected by network collector 120 from syslog server 160.

Profiling logic 220 is coupled to database 260. In response to a request to detect missing inventory, profiling logic 220 fetches neighbor data 264, topology data 266, and syslog data 268, and profiles the data to detect potentially missing devices according techniques described further below.

Once a potentially missing device is detected, profiling logic 220 invokes consolidation logic 250 to add the missing device identifier to a list of unidentified inventory, generate a score for the missing device, and add a source identifier to a 'Seen on Device' list. The 'Seen on Device' list identifies source devices that detected the missing device. For example, if network devices A and B both detect neighboring network device C, and profiling logic determines that network device C is unidentified, network device C is added to the list of unidentified inventory, and network device A and B are both added to the 'Seen on Device' list for network device C. The 'Seen on Device' list is described further below. Consolidation logic 250 also generates a score for each source that detected the missing device according to techniques described further below. Consolidation logic 250 then stores the list of unidentified inventory, the 'Seen on Device' list, the scoring information and/or other missing device attributes in database 260.

Report generation logic 240 is coupled to database 260 and I/O interface 210. In one embodiment, input 212 is a request to view a report of unidentified inventory. In response to the request, report generation logic 240 fetches the list of unidentified inventory, the 'Seen on Device' list, and the scoring information from database 260. Based on this data, report generation logic 240 generates and formats an unidentified inventory report. The unidentified inventory report lists detected missing devices based on the scoring information associated with each missing device. The unidentified inventory report is returned as output 214 via I/O interface 210.

3.0 GATHERING DEVICE INFORMATION TO DETECT UNIDENTIFIED INVENTORY

3.1 Profiling Neighbor Data

Figure 3A:
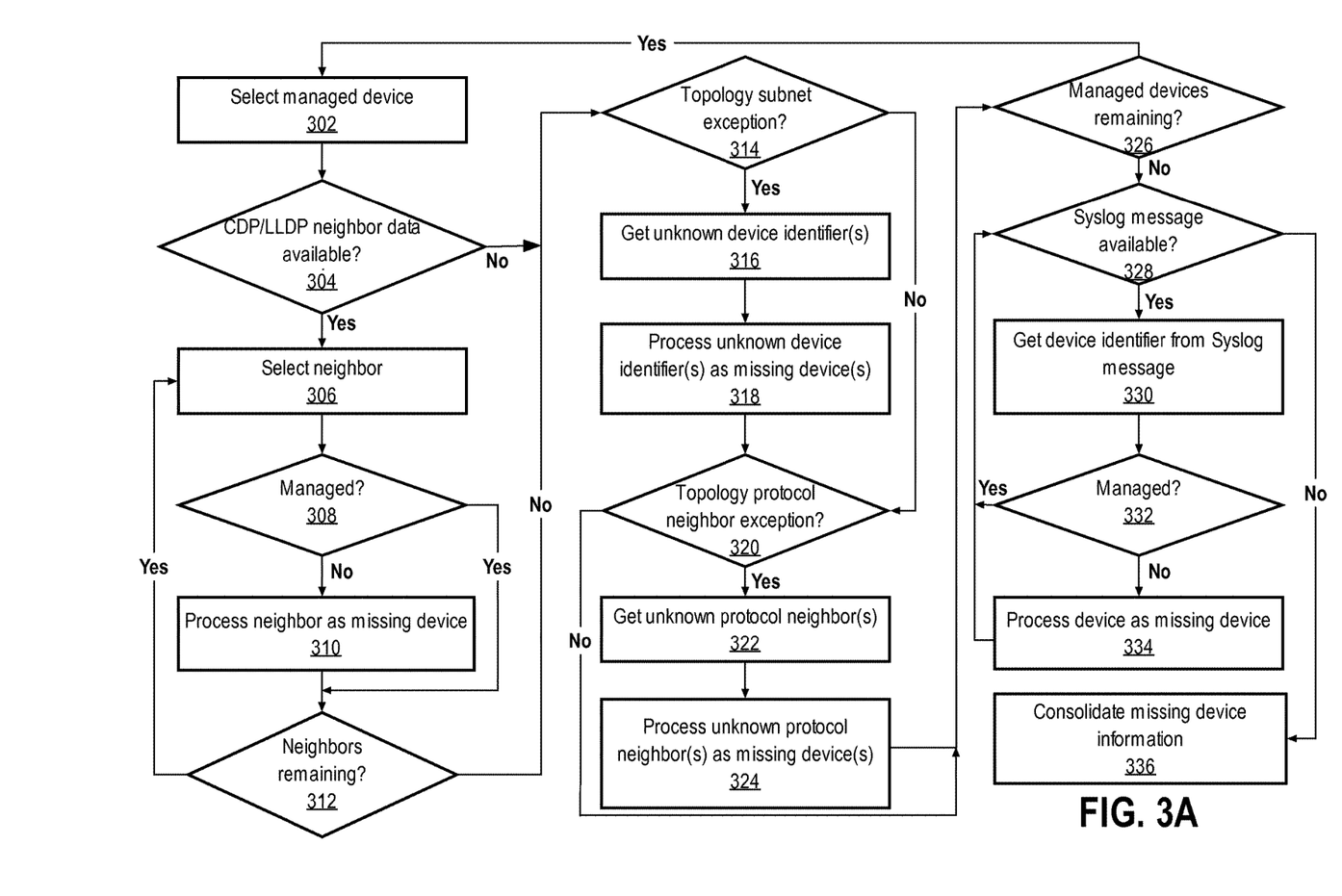
FIG. 3A illustrates an approach for profiling collected data to detect potentially unidentified devices in accordance with an embodiment.

Steps 302 to 312 and 326 of FIG. 3A illustrate an approach for profiling neighbor data to detect unidentified inventory. In step 302, a managed device is selected from the known inventory. For example, profiling logic 220 may select the first managed device on a known inventory list stored in database 260. In one embodiment, steps 302 and 312 are repeated for every managed device from which network collector 120 gathered data.

In step 304, profiling logic 220 determines whether CDP or LLDP neighbor data is available for the selected managed device. CDP and LLDP MIB and/or CLI data provides information about the managed device's neighbors, including both managed and non-managed neighboring devices. By using the information available in the CDP/LLDP MIB and CLI data, unidentified neighboring devices may be detected. According to one embodiment, profiling logic 220 checks for CLI data first. CLI data typically provides more detailed information about neighboring devices than MIB data. The more detailed information may be stored in the database of unidentified inventory and included in the unidentified inventory report. The additional information may be helpful to a network administrator to pinpoint the missing device. If the CLI data is unavailable, then profiling logic 220 checks if MIB information is available.

If neighbor data is available for the managed device, then the process continues with step 306. In step 306, a neighbor that is identified by the CDP/LLDP neighbor data is selected. For example, profiling logic 220 may parse the neighbor data to extract a device identifier for a neighbor.

In step 308, profiling logic 220 determines whether the selected neighbor is managed. According to one embodiment, profiling logic 220 compares the neighbor's device identifier to device identifiers for devices on the known inventory list to determine whether the neighbor is already managed. Techniques for comparing device identifiers are discussed further below in connection with FIG. 3B.

If the neighbor device is already managed, then the process skips to step 312. Otherwise, in step 310, the neighbor is processed as a missing device. In one embodiment, profiling logic 220 invokes consolidation logic 250 and passes device information, including a device identifier for the missing device, to consolidation logic 250. Consolidation logic 250 processes the missing device according to techniques described further below in connection with FIG. 4.

In step 312, profiling logic 220 determines whether there are any remaining neighbors for the managed device based on the CDP/LLDP neighbor data. If a neighbor has not yet been profiled, then steps 306-310 are repeated for every remaining neighbor device. If no neighboring devices remain, then the process continues to step 314, which begins topology data profiling for the selected managed device.

Although FIG. 3A shows the profiling of neighbor data, topology data, and syslog data in a specific order, the order illustrated is not required. For example, topology data may be profiled before neighbor data, and syslog data may be profiled before topology or neighbor data. In addition, profiling syslog data, topology data, and syslog data may be performed in independent processes and/or in isolation.

3.2 Profiling Topology Data

Steps 314 to 326 of FIG. 3A illustrate an approach for profiling topology data to detect missing devices. In step 314, it is determined whether a topology subnet exception exists for the selected managed device. The topology subnet exception lists all /30 and /31 subnets, serial interfaces, frame permanent virtual circuit (PVC) sub-interfaces, and/or other interfaces where only one node is seen. For example, if the selected managed device has a subnet of /30 or /31 and a network identifier for a partner device is not found in any of a managed network's configurations, then a topology subnet exception for the selected managed device exists.

If no topology subnet exception exists for the selected managed device, then the process continues with step 320. Otherwise, in step 316, profiling logic 220 gets the unknown device identifier from the topology data for the selected managed device. In one embodiment, the network collector gathers the topology data from the topology table of the selected managed device, which includes IP addresses of unknown partner devices. The unknown IP addresses are stored in database 260 as topology data 266. Profiling logic 220 then fetches these unknown IP addresses.

In step 318, the unknown device identifiers obtained in step 316 are processed as missing devices. For example, the collected IP addresses may be passed to consolidation logic 250 and processed according to techniques described in connection with FIG. 4.

In step 320, profiling logic 220 determines whether a topology protocol neighbor exception exists for the selected managed device. This exception lists all Data-Link Switching (DLSw) peer IP addresses and Border Gateway Protocol (BGP) neighbor IP addresses where the peer/neighbor IP address is not found in any of a managed network's configurations. This information is gathered by network collector 120 and stored in database 260 as topology data 266.

If no topology protocol neighbor exception exists, then the process continues with step 326. Otherwise, in step 322, the device identifiers for the unknown protocol neighbors are obtained. For example, the DLSw peer IP addresses or BGP neighbor IP addresses may be fetched from database 260.

In step 324, the unknown protocol neighbors are processed as missing devices. For example, the DLSw peer IP addresses and/or BGP neighbor IP addresses may be passed to consolidation logic 250 and processed according to techniques described in connection with FIG. 4.

In step 326, profiling logic 220 determines whether there are remaining managed devices for which to profile data. In one embodiment, the neighbor and/or topology profiling of steps 302 to 324 is performed for each managed device on a list of known managed devices. Alternatively, steps 302 to 324 may be performed for each managed device from which network collector gathered data. If there are no remaining devices, then the process continues with step 328.

3.3 Profiling Syslog Data

Steps 328 to 334 of FIG. 3A illustrate an approach for profiling syslog data to detect missing devices. In step 328, profiling logic 220 determines whether syslog messages are available for profiling. If all syslog messages have already been profiled, or there are no syslog messages available for profiling, then the process skips to step 336.

If syslog messages are available for profiling, in step 330, profiling logic 220 selects a syslog message and parses the syslog message to get a device identifier. Typically, the header of the syslog message identifies the hostname or IP address of the device that generated the syslog message. Profiling logic 220 may extract this information from the header and use it to determine whether the device that generated the syslog message is known.

In step 332, profiling logic 220 determines whether the device identified by the syslog message is already managed. According to one embodiment, the device identifier in the syslog message is matched with the managed device names and Sysnames across all the known managed devices on network 130. Techniques for determining whether a device is managed are described further below in connection with FIG. 3B. If the device is already managed, then the process returns to step 328. Otherwise, in step 334, the device that generated the syslog message is processed as a missing device according to techniques described below in connection with FIG. 4. In one embodiment, profiling logic 220 invokes consolidation logic 250 and passes the device identifier that it obtained from the syslog message.

In one embodiment, steps 328 to 332 are performed for each Syslog message before step 334. Only syslog message that identify missing devices are stored in database 260. After the neighbor and topology profiling have completed, the syslog messages in database 260 are moved to temporary storage. All syslog messages in database 260 are then deleted except for the latest syslog messages that have not yet been profiled. Each syslog message in temporary storage is then processed as a missing device according to techniques described below.

After all data profiling has completed, in step 336 the data collected for each missing device is consolidated. In one embodiment, a final score for each missing device is generated based on the information that was gleaned from profiling. Based on the consolidated data, an unidentified inventory report may be generated that identifies the missing devices and their attributes.

3.4 Determining Device Status

Figure 3B:
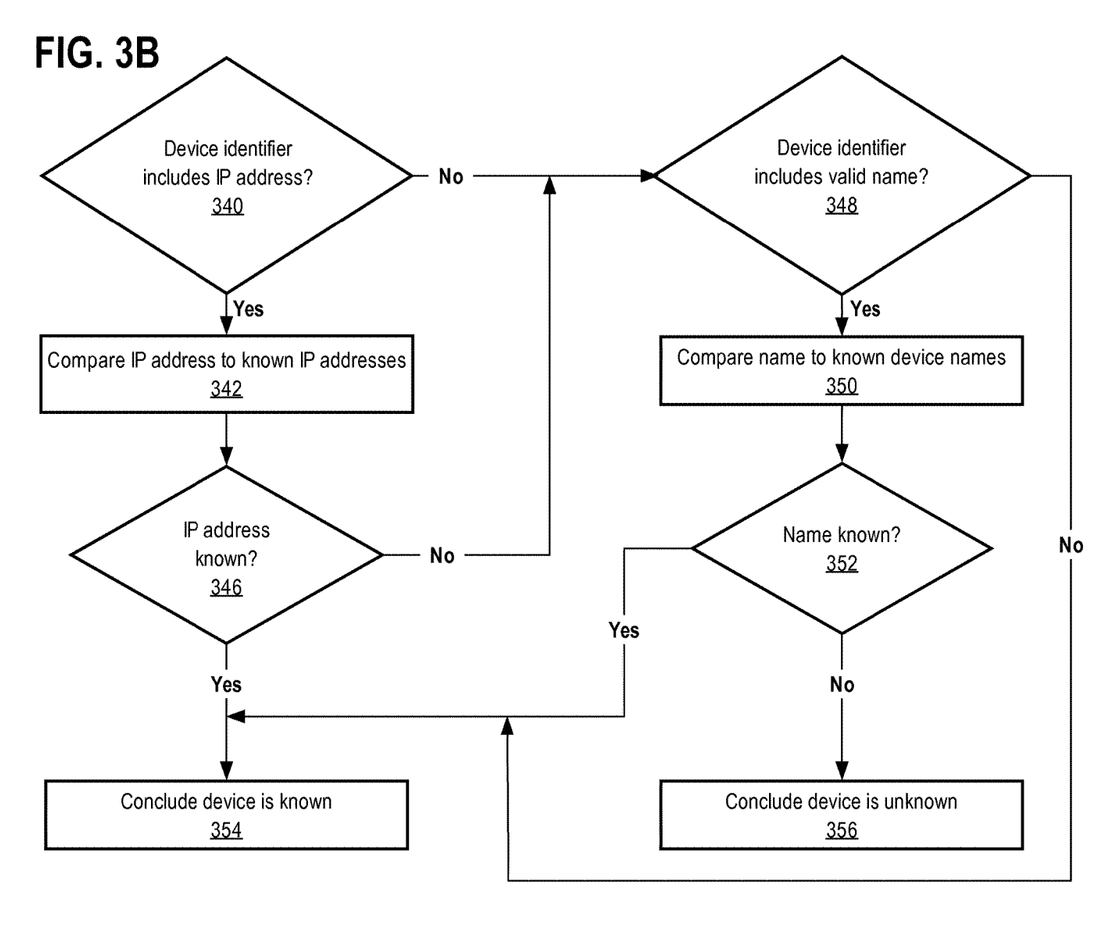
FIG. 3B illustrates an approach for determining whether a device is unidentified in accordance with an embodiment.

FIG. 3B illustrates an approach for determining whether a device is known or unidentified, according to an embodiment. In step 340, profiling logic 220 parses the device identifier to determine whether the device identifier includes an IP address. The IP address is typically easier and more accurate to match because the format of the device name may vary depending on the device's configurations. If the device identifier includes an IP address, then the process continues with step 342. Otherwise, the process continues with step 348.

In step 342, the IP address of the device is compared with IP addresses for known, managed devices. In one embodiment, database 260 may maintain a database table of all known IP addresses for an organization that manages network 130. The IP address of the device is then compared to the IP address in the database table.

In step 346, it is determined whether the IP address is known based on the comparison performed in step 342. If the IP address matches any known IP addresses, then profiling logic 220 determines that the device is known in step 354. If the IP address is unknown, then the process continues with step 348.

In step 348, profiling logic 220 checks whether the device identifier contains a valid name. In one embodiment, database 260 maintains a list of platforms that should not be added to managed inventory. For example, the list of platforms may include associated personal computers, Cisco IP Phones, Cisco ATA 186, Cisco FastHub 400 Series, Cisco IP Conference Stations, Communicators, HP devices, Polycom, SecureStacks and/or other platforms depending on the implementation. If profiling logic 220 determines that the platform is not supported, then the process continues with step 354 to avoid adding the device to the missing device list. In one embodiment, if the device name is in Media Access Control (MAC) address format or serial number format (pattern is \w(3) \d(4) \w(3)), then the device name is considered invalid, and the process continues with step

354. In one embodiment, the device name is formatted to generate a valid name. For example, if the device name is in the format of Hostname(Serial No), then the (Serial No) is stripped off and the Hostname is processed as the device name. If the device name is in the format of SerialNo (Hostname), then the Hostname part is extracted and processed as the device name.

If the device identifier is valid, then in step 350, the device name is compared with known device names. In one embodiment, database 260 includes a managed devices database of all Seed file entries and Sysnames for a managed network. Profiling logic 220 compares the device name with the Seed file entries and Sysnames, ignoring the domain names. For example, database 260 may also include a database of domain names for the managed network. If the missing device name does not match any of the managed device names and contains only zero or one "." characters, then a "." and a domain name are appended to the missing device name. For instance, for the domain name "domain.com", a device with name "Router" would become "Router.domain.com." The modified device name is then compared with the managed device names. If there is no match, then the missing device name is modified with the next domain name until there is a match or there are no domain names remaining. If there is no match and all domain names have been tried, or if the missing device contains more than one "." then the missing device name is parsed to determine if it contains a domain name from the database of domain names. If the missing device name includes a domain name, then it is stripped from the missing device name, including the ".", and the modified device name is compared with all Seed file entries and Sysnames. For instance, if the device name is "Router.domain.com", and "domain.com" is included in the database of domain names, then ".domain.com" is stripped from the device name and "Router" is compared with the Seed file entries and Sysnames. The table below shows an example of the match result when ignoring domain names.

| Missing Device Name | Network Element Name in managed devices database | Sysname | Device Domainname List | Match Result |
|---|---|---|---|---|
| Router | Router | | | Match |
| Router | Router1 | Router | | Match |
| Router | Router1 | Router1 | | No Match |
| Router | Router.domain.com | | Domain.com | Match |
| Router | Router1.domain.com | | Domain.com | No Match |
| Router | Router.domain.com | | Tv.net | No Match |
| Router | Router1.domain.com | Router.domain.com | Domain.com | Match |
| Router | Router1.domain.com | Router1.domain.com | Domain.com | No Match |
| Router | Router1.domain.com | Router.domain.com | Tv.net | No Match |
| Router.domain.com | Router.domain.com | | | Match |
| Router.domain.com | Router1.domain.com | Router.domain.com | | Match |
| Router.domain.com | Router1.domain.com | Router1.domain.com | | No Match |
| Router.domain.com | Router | | Domain.com | Match |
| Router.domain.com | Router1 | | Domain.com | No Match |
| Router.domain.com | Router | | Tv.net | No Match |
| Router.domain.com | Router1 | Router | Domain.com | Match |
| Missing Device Name | Network Element Name in managed devices database | Sysname | Device Domainname List | Match Result |
| Router.domain.com | Router1 | Router1 | Domain.com | No Match |
| Router.domain.com | Router1 | Router | Tv.net | No Match |

In step 352, profiling logic determines whether the device name is known based on the comparison performed in step 350. If the device name is known, then, in step 354, profiling logic 240 concludes that the device is known. If the device name is unknown, then, in step 356, profiling logic concludes that the device is unidentified.

4.0 CONSOLIDATING UNIDENTIFIED INVENTORY DATA

4.1 Processing the Missing Device

Figure 4:
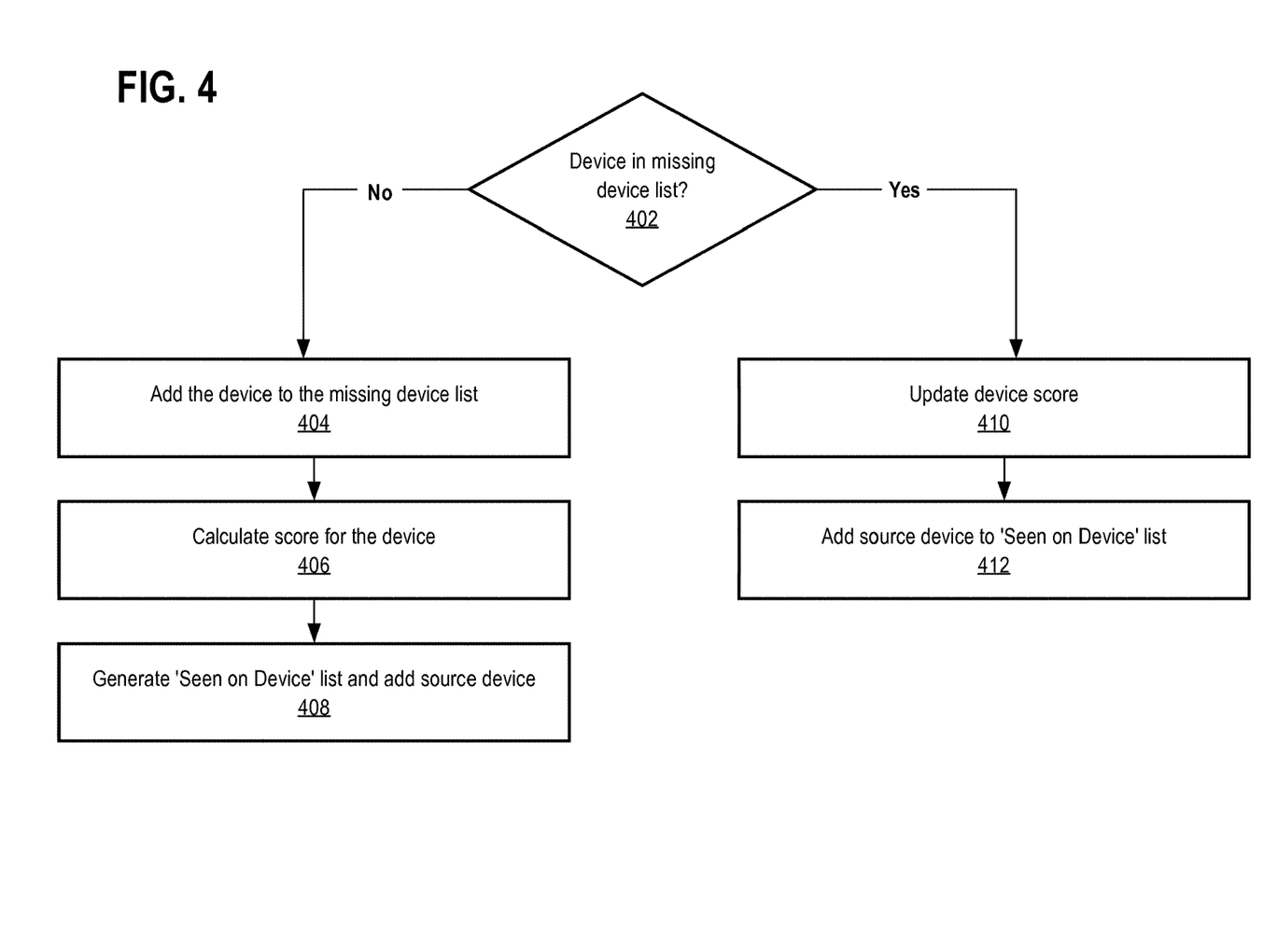
FIG. 4 illustrates an approach for processing unidentified device data in accordance with an embodiment.

FIG. 4 illustrates an approach for processing missing devices, according to an embodiment. In step 402, consolidation logic 250 determines whether the device has already been added to the missing device list. For example, consolidation logic 250 compares the device identifiers of the unidentified devices with device identifiers stored in the missing device list. If the missing device has not been added to the missing device list, then the process continues with step 404.

In step 404, the unidentified device is added to the missing device list. In one embodiment, the missing device list is a database of unknown inventory containing one or more attributes for each of the missing devices. The device attributes listed in the table below may be stored in the database, depending on the source of the data that detected the unidentified device. In one embodiment, adding a device to the missing device list includes adding one or more device identifiers to the list. For example, the hostname and IP address of the device may be added to the list.

In step 406, a score is calculated for the missing device according to techniques described further below. The score indicates the reliability of the data that detected the unidentified device. The score may be calculated according to the techniques described below.

In step 408, a 'Seen on Device' list is generated and associated with the missing device. The source device that detected the missing device is then added to the list. In one embodiment, both the source device name and collector ID are added to the list. For example, both the hostname and the IP address of the managed device selected in step 302 may be added to the list. In one embodiment, the interface and platform of the source device are also added to the 'Seen on Device' list. For example, CDP data often includes a PLATFORM field that identifies the name of the hardware platform of the source device. Similarly, CDP data includes an INTERFACE field that identifies the interface of the source device. Consolidation logic 250 may parse the CDP data for information about the source device and add the information to the list. If the missing device is detected based on Syslog profiling, then an indication that the Syslog server or that the missing device itself detected the device may be added to the list.

If the device is already on the missing device list, then in step 410, the score for the device is updated, according to techniques described below. In step 412, the source device is then added to the 'Seen on Device" list.

4.2 Generating and Consolidating Scores

In one embodiment, each source generates a separate score for the missing device. Thus, up to four "source" scores will be generated for each missing device: a CDP/LLDP score, a Syslog score, a TP-Subnet score, and a TP-Protocol Score.

In one embodiment, each missing device detected through CDP/LLDP profiling is assigned a CDP/LLDP score. Every time a missing device is identified via CDP or LLDP profiling (either MIB or CLI but not both), the CDP/LLDP score is incremented based on the number of interfaces that detected the missing device. For example, one point may be added to the CDP/LLDP score for the missing device name and one point may be added for each interface that detected the device. Proceeding with the above example, if the missing device was seen on one interface, the CDP/LLDP score would be two. If the missing device was seen on two interfaces, the CDP/LLDP score would be three. Thus, the more interfaces that see a missing device, the more likely the missing device should be included in managed inventory and the higher the score.

In one embodiment, each missing device detected through the topology subnet exception is assigned a TP-Subnet score. If an IP address is identified via TP-Subnet source neighbor, a TP-Subnet score is assigned. For example, if a TP-Subnet source neighbor detects the missing device, then the missing device may be assigned TP-Subnet score of two points.

In one embodiment, each missing device detected through the topology protocol exception is assigned a TP-Protocol score. Every time a missing IP address is identified via a TP-Protocol source neighbor, the TP-Protocol score is incremented. For example, the TP-Protocol score may be incremented by two points every time the missing device is detected. This allows a missing hub device to bubble to the top of the missing inventory list because the missing hub should be identified by many different TP-Protocol source neighbors.

In one embodiment, each missing device detected through syslog profiling is assigned a Syslog score. The syslog score is calculated based on whether the source syslog message contained an IP address for the missing device. If the source syslog message included an IP address for the missing device, then the likelihood of a false positive is very low. Thus, a higher Syslog score is assigned than if the source syslog message did not include and IP address. For example, in one embodiment, a missing device may be assigned a Syslog score of four points if the missing device is identified with an IP address, and two points if the missing device is only identified by a device name.

Once the profiling is complete, consolidation logic 250 examines the source scores for every missing device. Based on the source scores, consolidation logic 250 consolidates and assigns a final score to each missing device. In one embodiment, if the CDP/LLDP and syslog profiling find the same device name (ignoring the domain name), then the missing CDP/LLDP device is configured to use the correct syslog server; therefore, the missing device is very likely part of the same management domain and not a false positive. Thus, the CDP/LLDP and/or syslog score is incremented if the CDP/LLDP and syslog profiling find the same device name. For instance, the CDP/LLDP score may be incremented by four points if the syslog profiling finds the same device name.

In one embodiment consolidation logic 250 assigns the maximum of all scores assigned to a missing device as the final score for the missing device. For example, if a missing device has a CDP score of seven, a Syslog score of four, a TP-protocol score of four, and no TP-subnet score (or a score of zero), then the final score assigned to the missing device is seven.

The specific point values and scoring techniques described above are for illustrative purposes only. Alternative point values, ratios, and/or scoring techniques may be generated based on the profiled data and may vary from implementation to implementation depending on the reliability of the source data and/or the number of sources that detected a missing device.

4.3 Deriving a Final Report of Unidentified Inventory

The table below summarizes the missing device attributes that may be determined based on the techniques described above and the source of the information from which the attribute is derived.

| Missing Device Attribute | Source of Information |
| --- | --- |
| Missing Device Name | From CDP/LLDP and Syslog |
| Missing Device IP Address | From CDP CLI, Config-Subnet, Config-Protocol and Syslog |
| Source | From CDP/LLDP, Syslog, Config-Subnet, Config-Protocol |
| Seen by Network Element Name | Source managed element name |
| Seen on Interface | INTERFACE from CDP CLI, INTERFACE from Config-Subnet or Config-Protocol |
| Source Collector ID | The collector id for the source managed network element name |
| Platform | PLATFORM from CDP/LLDP |
| Score | From score generated based on techniques described above |

In response to a request for a report of unidentified inventory, one or more of the above attributes may be included in the report. According to one embodiment, the report includes a final list of unidentified inventory that is sorted based at least in part on the final score associated with each missing device. Missing devices with higher scores are displayed at the top of the list to highlight the missing devices most likely present on the network. The inventory report may be presented to a network administrator for viewing.

5.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
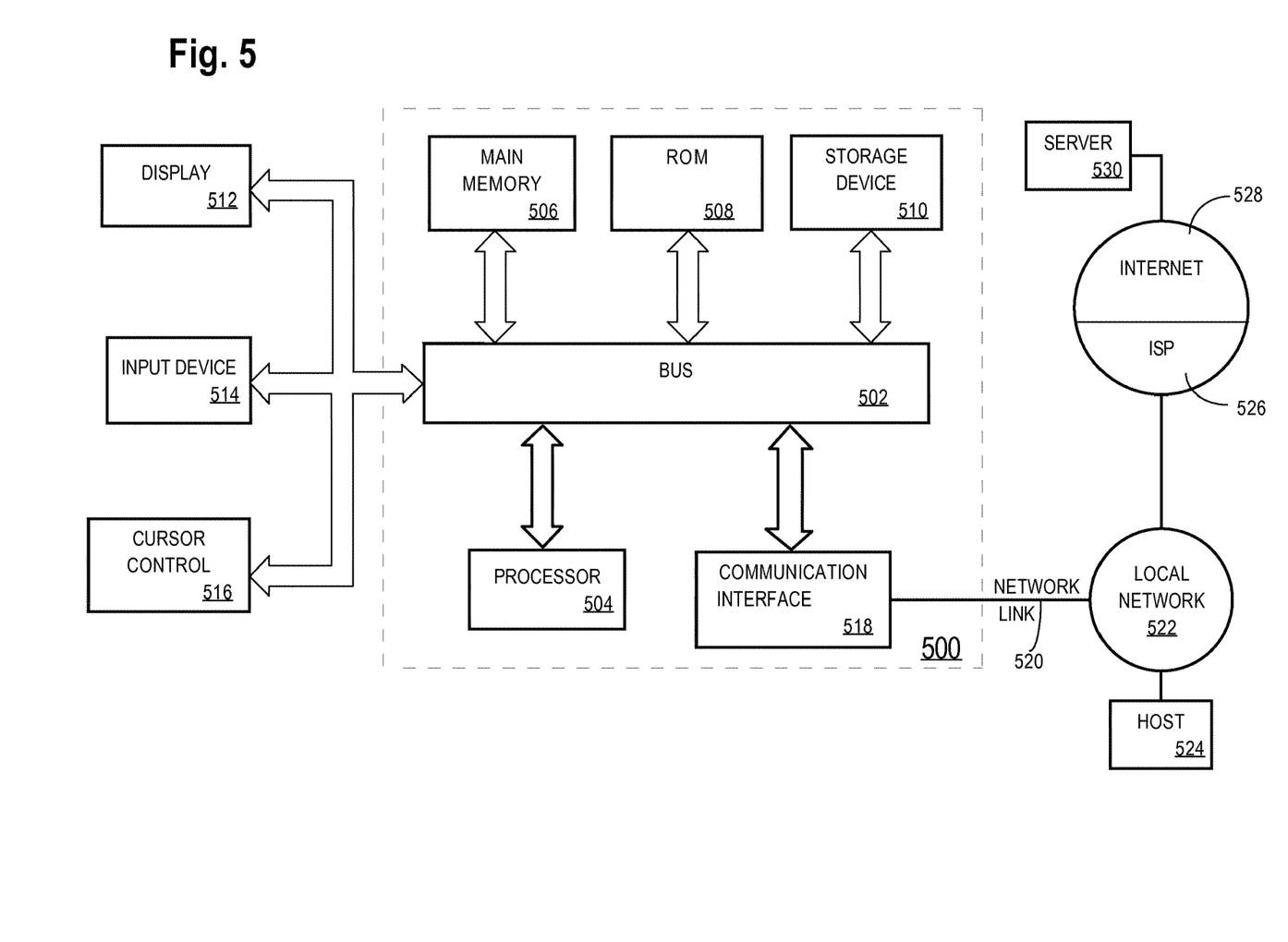
FIG. 5 illustrates a computer system upon which an embodiment may be implemented

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), liquid crystal display (LCD), or light emitting diode (LED or OLED) display, for displaying information to a computer user. An input device 514, including alphanumeric input such as keys, is coupled to bus 502 for communicating information and command selections to processor 504. Another type of user input device is cursor control 516, such as a mouse, a trackball, an accelerometer, or cursor direction keys or sensors for communicating direction information and command selections to processor 504 and for controlling cursor movement on display 512. Input device 514 and cursor control 516 may be implemented on a touchscreen mechanism commonly attached to smartphones and other mobile devices. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 ADDITIONAL EMBODIMENTS

1. A non-transitory computer-readable storage medium comprising one or more sequences of instructions which when executed cause performing: receiving data that was collected from a plurality of network devices; wherein the data includes at least one device identifier for a neighboring network device of at least one network device of the plurality of network devices; comparing the at least one device identifier for the neighboring network device to one or more device identifiers of known network devices; in response to determining that the at least one device identifier for the neighboring network device does not match a device identifier for the known network devices, adding the at least one device identifier to a list of unidentified inventory; wherein the non-transitory computer-readable storage medium is performed by one or more computing devices.

2. The non-transitory computer-readable storage medium of Claim 1, further comprising instructions which when executed cause, for each selected network device of the plurality of network devices: determining whether data collected from the selected network device includes a set of device identifiers for a set of neighboring network devices; determining which neighboring devices of the set of neighboring devices are unidentified network devices by comparing each device identifier of the set of device identifiers to the one or more device identifiers of the known network devices.

3. The non-transitory computer-readable storage medium of Claim 2, further comprising instructions which when executed cause: for each unidentified network device, determining whether a corresponding device identifier for the unidentified network device has been added to the list of unidentified inventory; if the corresponding device identifier has not been added to the list of unidentified inventory, adding the corresponding device identifier to the list of unidentified inventory.

4. The non-transitory computer-readable storage medium of Claim 3, further comprising instructions which when executed cause: adding device identifier for the selected network device that detected the unidentified network device to a list of devices that have detected the unidentified network device.

5. The non-transitory computer-readable storage medium of Claim 3, further comprising instructions which when executed cause: generating a score for each unidentified network device; wherein the score is based, at least in part, on how many selected network devices of the plurality of network devices detected the unidentified network device.

6. The non-transitory computer-readable storage medium of Claim 5, further comprising instructions which when executed cause, if the corresponding device identifier has already been added to the list of unidentified inventory, updating the score for the unidentified network device by incrementing the score.

7. The non-transitory computer-readable storage medium of Claim 5, further comprising instructions which when executed cause sorting the list of unidentified inventory based on the score for each unidentified network device on the list of unidentified inventory.

8. The non-transitory computer-readable storage medium of Claim 5, further comprising instructions which when executed cause: determining whether the unidentified network device sent a syslog message; in response to determining that the unidentified network device sent a syslog message, updating the score for the unidentified network device by incrementing the score.

9. The non-transitory computer-readable storage medium of Claim 2, wherein data collected from the selected network device includes Cisco Discovery Protocol (CDP) or Link Layer Discovery Protocol (LLDP) data.

10. The non-transitory computer-readable storage medium of Claim 2, wherein data collected from the selected network device includes topology data from a topology table of the selected network device.

11. A non-transitory computer-readable storage medium comprising one or more sequences of instructions which when executed cause: determining a topology exception for a network device on a managed network; in response to determining the topology exception, identifying one or more network identifiers for unidentified network devices based on topology data from the network device; adding the one or more network identifiers to a list of unidentified inventory; wherein the non-transitory computer-readable storage medium is performed by one or more computing devices.

12. The non-transitory computer-readable storage medium of Claim 11, wherein the topology exception is a subnet topology exception and the unidentified network device is a partner node of the network device.

13. The non-transitory computer-readable storage medium of Claim 11, wherein the topology exception is a topology protocol exception and the unidentified network device is an unidentified Border Gateway Protocol (BGP) neighbor of the network device.

14. The non-transitory computer-readable storage medium of Claim 11, wherein the topology exception is a topology protocol exception and the unidentified network device is an unidentified Data-Link Switching (DLSw) neighbor of the network device.

15. The non-transitory computer-readable storage medium of Claim 11, further comprising instructions which when executed cause performing said determining and identifying for a plurality of network devices, the non-transitory computer-readable storage medium further comprising instructions which when executed cause: generating a score for each unidentified network device based on how many network devices detect the unidentified network device.

16. A non-transitory computer-readable storage medium comprising instructions which when executed cause: determining, from a syslog message, a device identifier for a network device that sent the syslog message; comparing the device identifier to device identifiers for known network devices; in response to determining that the device identifier does not match a device identifier for the known network devices, adding the device identifier to a list of unidentified inventory; wherein the non-transitory computer-readable storage medium is performed by one or more computing devices.

17. The non-transitory computer-readable storage medium of Claim 16, wherein the syslog message is one of a plurality of syslog messages that are logged by a syslog server.

18. The non-transitory computer-readable storage medium of Claim 17, further comprising instructions which when executed cause performing the steps of determining, comparing, and adding for each syslog message logged by the syslog server.

19. The non-transitory computer-readable storage medium of Claim 16, wherein the plurality of syslog messages are collected from a syslog server using a network collector.

20. The non-transitory computer-readable storage medium of Claim 16, wherein the device identifier is at least one of an Internet Protocol (IP) address or a hostname.

7.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving data that was collected from a plurality of network devices, the data including network topology data that was gathered from one or more topology tables of one or more managed network devices in a managed network;
   determining that the network topology data collected from the one or more managed network devices of the managed network identifies a topology exception for an unidentified network device by detecting discrepancies between a configuration that includes the one or more managed network devices and the network topology data identifying the unidentified network device that is not included in the managed network, the topology exception being a topology protocol exception and the unidentified network device being an unidentified Data-Link Switching (DLSw) neighbor of the one or more managed network devices;
   in response to determining the topology exception, identifying one or more network identifiers for the unidentified network device based on the network topology data collected from the one or more managed network devices;
   adding the one or more network identifiers to a list of unidentified inventory;
   for each particular network identifier among the one or more network identifiers in the list of unidentified inventory, generating a score value representing a likelihood that the unidentified network device corresponding to that particular network identifier is present on the managed network, based on one or more source scores that are determined based upon one or more different data sources, and assigning the score value to that particular network identifier in the list of unidentified inventory; and
   wherein the method is performed by one or more computing devices.

2. The method of claim 1, wherein the topology exception is a subnet topology exception and the unidentified network device is a partner node of the one or more managed network devices.

3. The method of claim 1, wherein the topology exception is a topology protocol exception and the unidentified network device additionally being an unidentified Border Gateway Protocol (BGP) neighbor of the one or more managed network devices.

4. The method of claim 1, further comprising performing said determining and identifying for the plurality of network devices, the method further comprising:
   generating the score value for each unidentified network device based on how many network devices detect the unidentified network device.

5. A non-transitory computer-readable storage medium comprising one or more sequences of instructions which when executed cause:
   receiving data that was collected from a plurality of network devices, the data including network topology data that was gathered from one or more topology tables of one or more managed network devices in a managed network;
   determining that the network topology data collected from the one or more managed network devices of the managed network identifies a topology exception for an unidentified network device by detecting discrepancies between a configuration that includes the one or more managed network devices and the network topology data identifying the unidentified network device that is not included in the managed network, the topology exception being a topology protocol exception and the unidentified network device being an unidentified Data-Link Switching (DLSw) neighbor of the one or more managed network devices;
   in response to determining the topology exception, identifying one or more network identifiers for the unidentified network device based on the network topology data collected from the one or more managed network devices;
   adding the one or more network identifiers to a list of unidentified inventory;
   for each particular network identifier among the one or more network identifiers in the list of unidentified inventory, generating a score value representing a likelihood that the unidentified network device corresponding to that particular network identifier is present on the managed network, based on one or more source scores that are determined based upon one or more different data sources, and assigning the score value to that particular network identifier in the list of unidentified inventory.

6. The non-transitory computer-readable storage medium of claim 5, wherein the topology exception is a subnet topology exception and the unidentified network device is a partner node of the one or more managed network devices.

7. The non-transitory computer-readable storage medium of claim 5, wherein the topology exception is a topology protocol exception and the unidentified network device additionally being an unidentified Border Gateway Protocol (BGP) neighbor of the one or more managed network devices.

8. The non-transitory computer-readable storage medium of claim 5, further comprising instructions which when executed cause performing said determining and identifying for the plurality of network devices, the non-transitory computer-readable storage medium further comprising instructions which when executed cause: generating the score value for each unidentified network device based on how many network devices detect the unidentified network device.

* * * * *